United States Patent
Verhoeven et al.

(10) Patent No.: US 7,996,859 B2
(45) Date of Patent: Aug. 9, 2011

(54) OPTICAL DISC DEVICE PROTECTING THE OPTICAL PICKUP UNIT DURING EJECTION BY A CATCH MEMBER OF A TRAY DISPLACING A CATCH SURFACE OF THE OPTICAL PICKUP UNIT

(75) Inventors: Robertus Josephus Maria Verhoeven, Eindhoven (NL); Herman Van Der Kall, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 941 days.

(21) Appl. No.: 11/913,688

(22) PCT Filed: Apr. 28, 2006

(86) PCT No.: PCT/IB2006/051337
§ 371 (c)(1),
(2), (4) Date: Nov. 6, 2007

(87) PCT Pub. No.: WO2006/120597
PCT Pub. Date: Nov. 16, 2006

(65) Prior Publication Data
US 2008/0216104 A1 Sep. 4, 2008

(30) Foreign Application Priority Data
May 10, 2005 (EP) .................................... 05103861

(51) Int. Cl.
*G11B 7/0037* (2006.01)
*G11B 17/056* (2006.01)
*G11B 33/12* (2006.01)

(52) U.S. Cl. .............. 720/671; 720/605; 720/608
(58) Field of Classification Search .......... 720/608, 720/606, 601, 671, 660, 652, 605, 690
See application file for complete search history.

(56) References Cited

U.S. PATENT DOCUMENTS

| | | | | |
|---|---|---|---|---|
| 5,187,701 A * | 2/1993 | Verheyen | | 720/601 |
| 5,822,290 A * | 10/1998 | Lee | | 720/607 |
| 6,522,614 B1 | 2/2003 | Kim | | |
| 6,657,928 B1 * | 12/2003 | Nakatani et al. | | 369/33.01 |
| 2002/0136140 A1 * | 9/2002 | Arase | | 369/75.2 |
| 2003/0179695 A1 | 9/2003 | Murata | | |

FOREIGN PATENT DOCUMENTS

| | | | |
|---|---|---|---|
| EP | 0764947 | | 3/1997 |
| JP | 03286479 A | * | 12/1991 |
| JP | 2003115176 A | * | 4/2003 |
| JP | 2004158088 A | * | 6/2004 |

* cited by examiner

Primary Examiner — Julie Anne Watko

(57) ABSTRACT

An optical disc device comprising a tray (1) for carrying an optical disc, which tray (1) can move between a position inside the device and a position partly outside the device. The device also comprises a structure (13) for holding and driving the optical disc, which structure (13) is provided with a turntable (6) and an optical pickup unit (8) and guiding means for moving the optical pickup unit (8). The structure (13) can tilt around a horizontal tilt axis (14) behind the rotating optical disc. The tray (1) is provided with a catch member (9) and the optical pickup unit (8) is provided with a cooperating catch surface (20), whereby the catch member (9) may hit the catch surface (20) when the tray (1) moves, thereby displacing the optical pickup unit (8) into a save position.

6 Claims, 2 Drawing Sheets

OPTICAL DISC DEVICE PROTECTING THE OPTICAL PICKUP UNIT DURING EJECTION BY A CATCH MEMBER OF A TRAY DISPLACING A CATCH SURFACE OF THE OPTICAL PICKUP UNIT

The invention is related to an optical disc recording and/or reproducing device comprising a tray for carrying an optical disc, which tray can move between a backward position inside the device and a forward position partly outside the device in order to insert or remove the optical disc into or from the device, the device furthermore comprising a structure for holding and driving the optical disc during the recording or reproducing operation, which structure is provided with a turntable and an optical pickup unit behind the turntable and guiding means for moving the optical pickup unit in a plane parallel to the rotating optical disc between a forward position near the turntable and a backward position further away from the turntable, whereby the structure can tilt around a horizontal tilt axis behind the rotating optical disc between an upward position whereby the optical disc is drivingly clamped between the turntable and a clamper, and a downward position whereby the structure is moved downward and whereby the turntable is released from the optical disc.

The above expression 'behind' is related to the movement of the tray in the forward and backward direction, whereby 'behind' means at a location at some distance in the backward direction. In the forward position of the tray, the operator can remove and/or replace an optical disc by hand from and on the tray respectively. In the backward position of the tray, the optical disc can be lifted from the tray by said tilting structure, whereby the turntable engages the central portion of the optical disc and presses it against the damper above the optical disc. Then, the optical disc can be rotationally driven by the turntable, or by the damper as the case may be, while the optical pickup unit moves underneath the optical disc along a radial directed path, i.e. radial directed with respect to the axis of rotation of the optical disc.

An optical disc recording and/or reproducing device of the above-described kind is, for example, disclosed in US-A-2003/0179695. The device may be part of a computer or may be incorporated in a music and/or video system. The optical disc may be a CD, a DVD, a Blu-Ray Disc, or any other optical or magneto-optical disc that can be read by means of an optical pickup unit.

In general, the device can be opened by pushing the 'eject' button, whereby the tray moves from its backward position to its forward position, for example in order to remove the optical disc from the device. However, before the tray starts moving in the forward direction, first said structure will tilt downward in order to release the optical disc and to place it on the tray. Thereby, the structure moves from a horizontal position (parallel with respect to the direction of movement of the tray) into an inclined position (making an angle with the direction of movement of the tray), whereby the part of the structure near the turntable is moved more downward than the part of the structure near the horizontal tilt axis behind the rotating optical disc.

Furthermore, before the tray starts moving in forward direction, the optical pickup unit will be moved in its forward position, i.e. will be placed close to the turntable. Because the structure is inclined, the forward position of the optical pickup unit is a lower position than its backward position, which backward position is nearer to the horizontal tilt axis of the structure. In case the optical pickup unit would not be located in its forward position during movement of the tray, but would be located in its backward position, the tray may hit and damage the objective lens of the optical pickup unit, because the objective lens is the uppermost part of the optical pickup unit. So, in normal circumstances, the tray will only start moving forward from its backward position in case the optical pickup unit is in its lowermost position.

However, it may occur that the tray is moved from its backward position to its forward position while the optical pickup unit is not in its forward position. For example, in case the electric current is cut off, so that the device cannot function. In that case, the tray can be moved forward by hand to remove the optical disc, whereby the objective lens of the optical pickup unit can be hit by the tray, when the optical pickup unit is in its backward position.

An object of the invention is to provide an optical disc recording and/or reproducing device of the type as described above, comprising a movable tray for carrying an optical disc in order to insert or remove the optical disc into or from the device, wherein the movement of the tray cannot damage parts of the optical pickup unit.

This object is achieved by the device as claimed in claim 1. Particularly in the device according to the invention, the tray is provided with a catch member and the optical pickup unit is provided with a cooperating catch surface, in such a way that the catch member hits the catch surface when the tray moves from said backward position to said forward position in case the optical pickup unit is in its backward position during movement of the tray, thereby displacing the optical pickup unit in forward direction, i.e. towards the turntable. Thereby, the optical pickup unit is displaced to a lower position, so that the moving tray cannot hit the objective lens when parts of the tray move over the optical pickup unit.

In one preferred embodiment, the objective lens of the optical pickup unit is located in the vertical plane of symmetry of the tray, whereby the catch member and the catch surface are located at a distance at one side of said plane, preferably at a distance larger than 7 mm. Thereby the radial path of the objective lens is located in said plane of symmetry of the tray, and the catch member follows a path parallel to the path of the objective lens, so that the catch member stays away from the objective lens, and therefore cannot hit the objective lens.

Preferably, the catch member is a protrusion at the lower side of the tray, so that it easily can hit the catch surface of the optical pickup unit. In one preferred embodiment, the catch member has an inclined lower surface, whereby the front side of the catch member is lower than its back side. The catch member hits the catch surface with its front side, or lower front edge, i.e. the leading side, when the tray is moving to its forward position. That front side must reach sufficiently low to contact the catch surface. After the optical pickup unit is pushed by the catch member to a low position, near the turntable, the catch member will pass over the catch surface when the tray moves further to its forward position. When the tray is subsequently moved backward to its backward position, the catch member will again pass over the catch surface. However, in case the catch member thereby would touch parts of the optical pickup unit, then the optical pickup unit will be pushed a little downward by the inclined lower surface of the catch member, so the catch member will not displace the optical pickup unit backward, i.e. away from the turntable.

In one preferred embodiment, the catch surface is a substantial vertical surface of a protrusion at the back side and/or top side of the optical pickup unit. At that location the catch member will easily contact the catch surface.

The invention will now be further elucidated by means of a description of some parts of an embodiment of an optical disc recording and/or reproducing device, which parts are the tray for carrying the optical disc and the structure comprising the optical disc drive and the optical pickup unit, whereby the tray can move between a backward position inside the device and a forward position partly outside the device in order to insert or remove the optical disc into or from the device. Thereby, reference is made to the drawing comprising figures which are only schematic representations, in which.

The figures are only diagrammatic representations, wherein only parts that are relevant for the elucidation of the invention are indicated.

Figure 1:
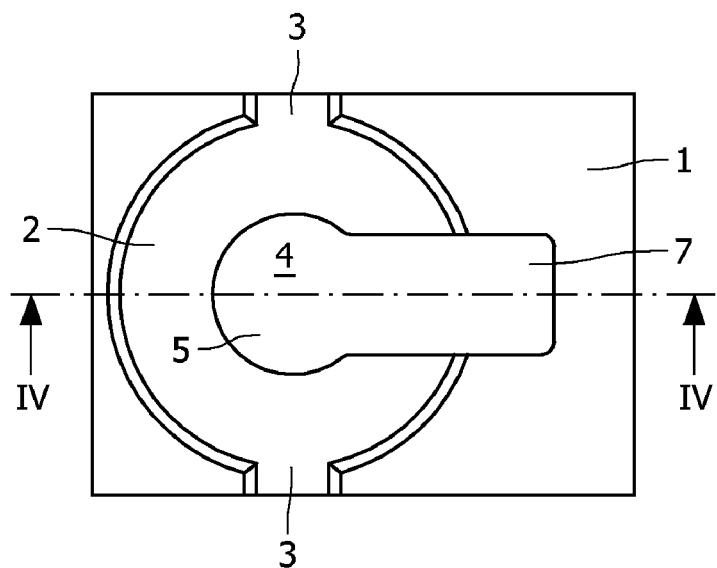
FIG. 1 is a top view of a tray.
Figure 2:
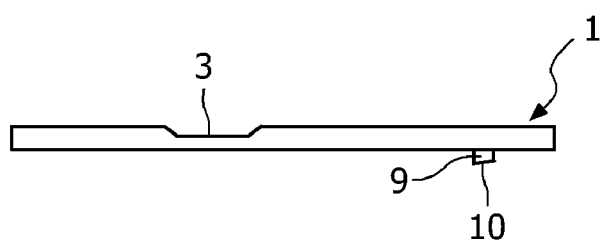
FIG. 2 is a side view of the tray according to FIG. 1.
Figure 3:
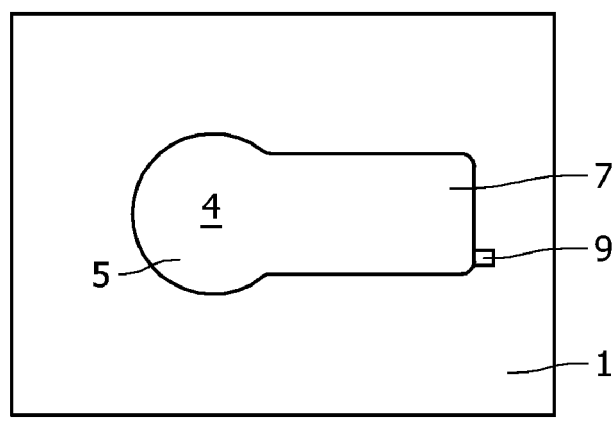
FIG. 3 is a bottom view of the tray according to FIG. 1.

The tray 1 as shown in FIGS. 1-4 is made of plastic and has a substantially rectangular shape in top view (FIG. 1) and in bottom view (FIG. 3). At its upper side, the tray is provided with a circular recess 2 for receiving and carrying a CD or DVD having a diameter of 12 cm. The recess 2 extends to both sides of the tray 1 whereby spaces 3 are formed so that the CD or DVD can be engaged by hand of the operator when it is carried by the tray 1.

Figure 5:
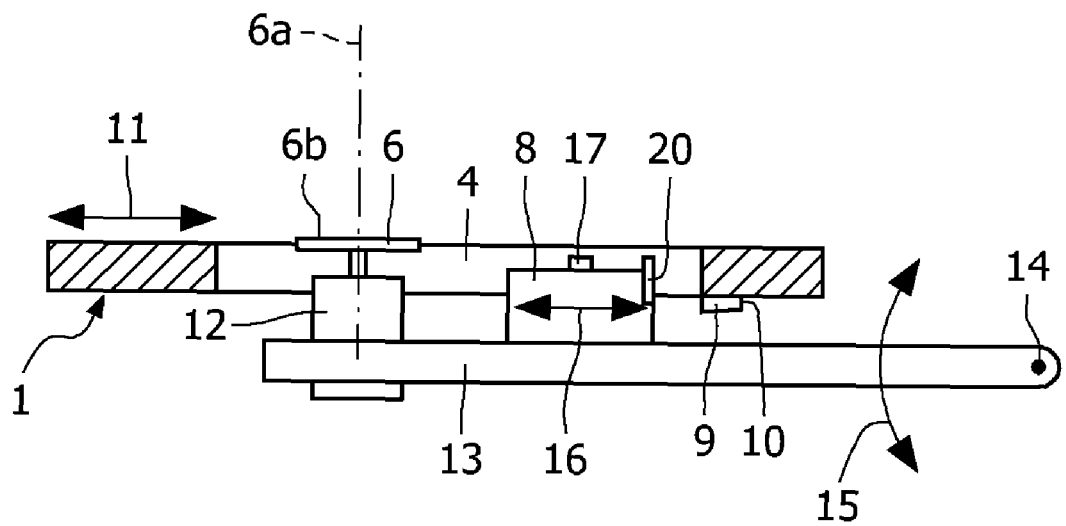
FIG. 5 shows the device according to the invention in an operational position.

The tray 1 is provided with a central opening 4 having a circular portion 5 for accommodating a turntable 6 when the CD or DVD is rotationally driven and having a substantially rectangular portion 7 for accommodating the optical pickup unit 8 when the CD or DVD is recording or reproducing (see FIG. 5). The turntable is rotatable around a rotation axis 6a and is provided with a supporting face 6b.

Figure 4:
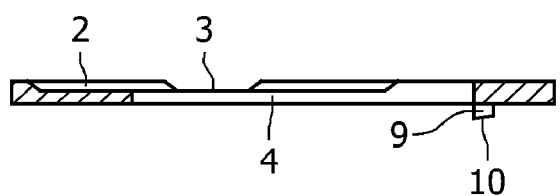
FIG. 4 is a sectional view according to the two arrows IV in FIG. 1.

The tray 1 is provided with a protrusion 9 at its lower side, which protrusion is rectangular in bottom view (FIG. 3) and has a flat inclined lower surface 10 in side view (FIGS. 2 and 4). The protrusion 9 is a catch member for displacing the optical pickup unit 8, as will be described hereinafter referring to FIGS. 5 and 6.

FIG. 5 shows the tray 1 in a sectional view and arrow 11 indicates the forward and backward movability of the tray 1. In FIG. 5 the tray 1 is represented in its backward position, whereby the tray 1 is inside the optical disc recording and/or reproducing device. In that backward position the turntable 6 and the optical pickup unit 8 can be present in the central opening 4 of the tray 1. Turntable 6 is mounted on the shaft of drive motor 12, and drive motor 12 is mounted on a structure 13, which structure 13 can rotate around a horizontal tilt axis 14, as is indicated with arrow 15.

The optical pickup unit 8 is guided by guiding means (not represented in the figures) in order to make a straight movement with respect to the structure 13, as is indicated with arrow 16, whereby the guiding means are attached to the structure 13. The movement of optical pickup unit 8 is a radial directed displacement with respect to the axis of rotation of the turntable 6, whereby the objective lens 17 of the optical pickup unit 8 moves near by and along the surface of the optical disc (not shown) that is clamped on the turntable 6 and rotating with the turntable 6.

Figure 6:
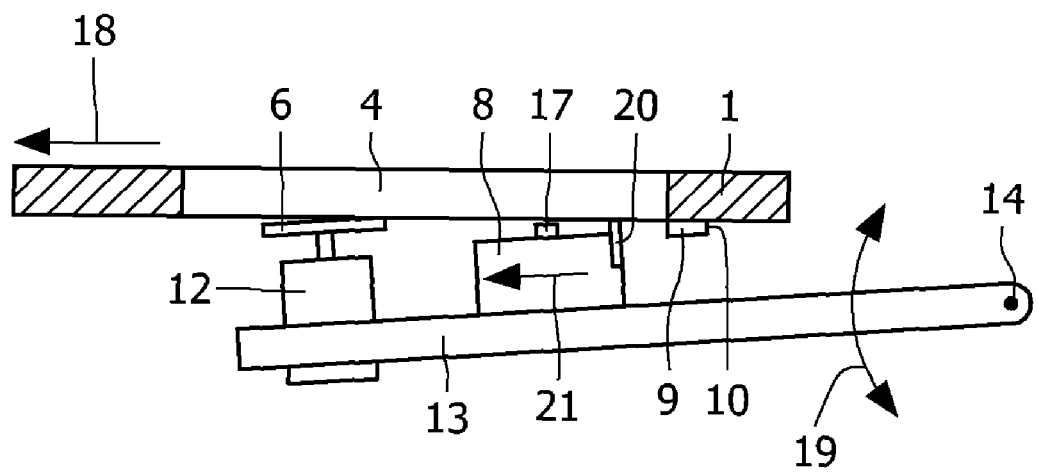
FIG. 6 shows the device in another position.

Before the tray 1 starts moving from the backward position to the forward position, indicated by arrow 18 in FIG. 6, the structure 13 moves downward as is indicated with arrow 19. Thereby, the turntable 6 arrives at a low position, so that the tray 1 can move over the turntable 6. Under normal circumstances, thereby the optical pickup unit 8 is in its forward position, near the turntable 6, whereby the tray 1 can also move over the optical pickup unit 8. However, in case the optical pickup unit 8 is, for whatever reason, in its backward position, then the tray 1 may contact and damage the objective lens 17 of the optical pickup unit 8. In order to prevent such contact, the lower side of the tray 1 is provided with a catch member 9 that can hit a catch surface 20 of the optical pickup unit 8, so that the optical pickup unit 8 is moved to its forward position, near the turntable 6, as is indicated with arrow 21. Thereby the tray 1 cannot damage the objective lens 17 anymore.

The embodiment of the optical disc recording and/or reproducing device as described above is only an example; a great many other embodiments are possible.

In the Figures the device according to the invention is depicted in its horizontal position. It is however to be noted that the terms "horizontal", "vertical", "upward" and "downward" in this document also include corresponding references if the device is not oriented in its horizontal position.

The invention claimed is:

1. An optical disc recording and/or reproducing device comprising a tray for carrying an optical disc, which tray can move between a backward position inside the device and a forward position partly outside the device in order to insert or remove the optical disc into or from the device, the device furthermore comprising a structure for holding and driving the optical disc during operation, which structure is provided with a turntable being rotatable around a rotation axis and having a supporting face for the optical disc, an optical pickup and a guiding means for moving the optical pickup unit in a plane parallel to the supporting face between a forward position near the turntable and a backward position further away from the turntable, wherein the structure can tilt around a tilt axis oriented substantially perpendicular to the rotation axis between an upward position whereby the optical disc is drivingly clamped between the turntable and a clamper, and a downward position whereby the structure is moved downward and the turntable is released from the optical disc, wherein the tray is provided with a catch member and the optical pickup unit is provided with a cooperating catch surface, in such a way that the catch member hits the catch surface when the tray moves from said backward position to said forward position in case the optical pickup unit is in its backward position during movement of the tray, thereby displacing the optical pickup unit in forward direction.

2. The optical disc recording and/or reproducing device as claimed in claim 1, characterized in that the objective lens of the optical pickup unit is located in the vertical plane of symmetry of the tray, whereby the catch member and the catch surface are located at a distance at one side of said plane.

3. The optical disc recording and/or reproducing device as claimed in claim 2, wherein said distance is larger than 7 mm.

4. The optical disc recording and/or reproducing device as claimed in claim 1, characterized in that the catch member is a protrusion at the lower side of the tray.

5. The optical disc recording and/or reproducing device as claimed in claim 1, characterized in that the catch member has an inclined lower surface, whereby the front side of the catch member is lower than its back side.

6. The optical disc recording and/or reproducing device as claimed in claim 1, characterized in that the catch surface is a substantial vertical surface of a protrusion at the back side and/or top side of the optical pickup unit.

* * * * *